(12) United States Patent
Welsh et al.

(10) Patent No.: US 11,528,339 B2
(45) Date of Patent: *Dec. 13, 2022

(54) TWO-WAY PUSH NOTIFICATION OF ACTIVITY EVENTS THROUGH A WIRELESS DEVICE

(71) Applicant: Bank of America Corporation, Charlotte, NC (US)

(72) Inventors: John David Welsh, West Chester, PA (US); Elliot Piatetsky, New York, NY (US); Andrew Scott Humm, Mooresville, NC (US); Dana Michele Meadows, Rehoboth Beach, DE (US); Amy Heather DeLeon, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,239

(22) Filed: Jul. 16, 2021

(65) Prior Publication Data

US 2021/0344768 A1   Nov. 4, 2021

Related U.S. Application Data

(63) Continuation of application No. 16/387,990, filed on Apr. 18, 2019, now Pat. No. 11,095,740.

(51) Int. Cl.
*H04L 67/55* (2022.01)
*H04W 4/14* (2009.01)
(Continued)

(52) U.S. Cl.
CPC .......... *H04L 67/55* (2022.05); *G06Q 20/401* (2013.01); *H04L 51/046* (2013.01); *H04L 51/58* (2022.05); *H04L 63/1425* (2013.01); *H04W 4/14* (2013.01)

(58) Field of Classification Search
CPC . H04L 67/26; H04L 12/1859; H04L 12/1895; H04W 4/14; G06Q 20/401; G06Q 20/4016

See application file for complete search history.

(56) References Cited

U.S. PATENT DOCUMENTS 8,526,455 B2   9/2013   Vyrros et al.
8,756,225 B1   6/2014   Lipkin et al.
(Continued)

OTHER PUBLICATIONS

Jul. 1, 2020—U.S. Non-final office action, U.S. Appl. No. 16/387,990.

*Primary Examiner* — Caroline H Jahnige
(74) *Attorney, Agent, or Firm* — Banner & Witcoff, Ltd.

(57) ABSTRACT

Aspects described herein relate a computer system detecting an unusual activity event from activity data and sending a two-way notification message to a wireless device when a user has opt-in for a mobile application. The two-way push notification message is received at a wireless device and notification information is displayed at the wireless device outside the mobile application. The user selects one of the displayed action buttons to indicate whether the unusual activity event is valid or invalid. When a response to the computer system indicates that the unusual activity is valid, the computer system clears the inquiry and sends a subsequent push notification message to the wireless device informing the user. When the response indicates that the unusual activity is invalid, the computer system and the wireless device may establish an interaction through the mobile application in order to resolve the unusual activity event.

20 Claims, 8 Drawing Sheets

(51) Int. Cl.
*H04L 51/046* (2022.01)
*H04L 9/40* (2022.01)
*G06Q 20/40* (2012.01)
*H04L 51/58* (2022.01)

(56) References Cited

U.S. PATENT DOCUMENTS

| | | | |
|---|---|---|---|
| 8,762,272 B1* | 6/2014 | Cozens | G06Q 20/223 |
| | | | 705/40 |
| 8,965,987 B2 | 2/2015 | Lehmann et al. | |
| 9,146,656 B1 | 9/2015 | Srinivasan et al. | |
| 9,866,645 B2 | 1/2018 | Sharda | |
| 10,754,518 B1* | 8/2020 | Bell | H04W 12/06 |
| 10,872,341 B1* | 12/2020 | Beckman | G06Q 20/4016 |
| 11,042,881 B2* | 6/2021 | Douglas | G06Q 20/4016 |
| 2010/0274691 A1* | 10/2010 | Hammad | G06Q 20/3221 |
| | | | 705/30 |
| 2014/0097961 A1 | 4/2014 | Vaglio et al. | |
| 2015/0082212 A1* | 3/2015 | Sharda | H04L 67/26 |
| | | | 715/764 |
| 2015/0212675 A1* | 7/2015 | Firstenberg | G06F 3/0484 |
| | | | 715/747 |
| 2016/0140550 A1 | 5/2016 | Keys | |
| 2017/0286960 A1* | 10/2017 | Gilboy | H04W 12/088 |
| 2018/0109386 A1* | 4/2018 | Khan | H04L 9/3271 |
| 2020/0286093 A1* | 9/2020 | Agrawal | H04L 63/10 |

* cited by examiner

# TWO-WAY PUSH NOTIFICATION OF ACTIVITY EVENTS THROUGH A WIRELESS DEVICE

CROSS REFERENCE TO RELATED APPLICATIONS

This application is a continuation of and claims priority to U.S. Application Ser. No. 16/387,990, filed Apr. 18, 2019, and entitled "Two-Way Push Notification of Activity Events Through a Wireless Device," which is incorporated herein by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that utilize two-way push notification to a wireless device to substantiate an activity event.

BACKGROUND

In order to inform a person about a detected unusual activity event (for example, invalid or fraudulent transactions), a supporting service may send a textual message informing the person about the detected unusual event to a user, and the user may respond with a textual message to the supporting service. This approach may be advantageous in that it may be fast, simple, and pervasive, but it may have a number of deficiencies. Some traditional approaches, may utilize short message service (SMS) However, there may a significant cost as well as legal restrictions (for example, stipulated in the Telephone Consumer Protection Act) to delivering an alert message about the detected event. Also, messaging services, such as SMS, support a free form and may result in unrecognizable text in the user's response. Moreover, traditional approaches may be vulnerable to impersonation and/or user uncertainty regarding authenticity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein may relate a computer system detecting an unusual activity event from the activity data, generating a notification request of the detected unusual activity event, and initiating a two-way notification message to a wireless device when a user has opt-in for the associated mobile application. The two-way push notification message is received at the wireless device and notification information is displayed when outside the mobile application at the wireless device. The user selects a displayed one of displayed action buttons to indicate whether the detected unusual activity event is valid or invalid. A notification response message is then returned to the computer system via the mobile application. When the response indicates that the detected unusual activity is valid, the computer system clears the inquiry and sends a push notification message to the wireless device informing the user about the clearing of the inquiry. When the response indicates that the detected unusual activity is invalid, the computer system and the wireless device may establish an interaction through the mobile application in order to resolve the detected unusual activity event.

With an aspect of the embodiments, when a user has user has chosen to opt-in for a mobile application, a two-way notification message may be sent to a user's wireless device, allowing the user to click through and open up an unauthenticated page where the user can respond. Notification information on the authenticated page may present one or more transactions for direct verification by the user, thus allowing the user to respond from within the notification itself. The notification information may include one or more action buttons from which the user can indicate the validity or invalidity of the one or more transactions. This approach circumvents direct interaction with the mobile application, thus enhancing a user's experience.

With an aspect of the embodiments, a user is able to respond to a notification alert and to verify an unusual activity event (for example, transactions) without authentication.

With an aspect of the embodiments, in response to receiving the first two-way push notification message by a computer system and when an activity indicator is indicative that the detected unusual activity event is invalid, the computer system sends a second push notification message to the wireless device, where the second push notification message is indicative of further action through the wireless device outside the mobile application.

With an aspect of the embodiments, an unusual activity event may include one or more monetary or non-monetary transactions attributed to a user of a wireless device. A two-way push notification message that is sent to the wireless device may contain transactional information pertaining to a fraud alert for the user to verify.

With an aspect of the embodiments, when a wireless device receives a two-way push notification message, displayed notification information includes first and second choices, where the first choice is indicative that the at least one transaction is valid and the second choice is indicative that the at least one transaction is invalid.

With an aspect of the embodiments, a user is provided an ability to self-service fraud alerts without having to login to a mobile application by using action buttons conveyed with a two-way push notification. If the user confirms that the transactions are valid, then another push notification is sent to inform the user that the user can proceed with transactions without having to login to the mobile application. If the user confirms that the transactions are invalid, then the user is redirected to the mobile application to continue with the claim filing process.

With an aspect of the embodiments, when a user has not opt-in for the mobile application, a computer system alternatively initiates transmission of a short message service (SMS) message about the detected unusual activity event to a wireless device of the user.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
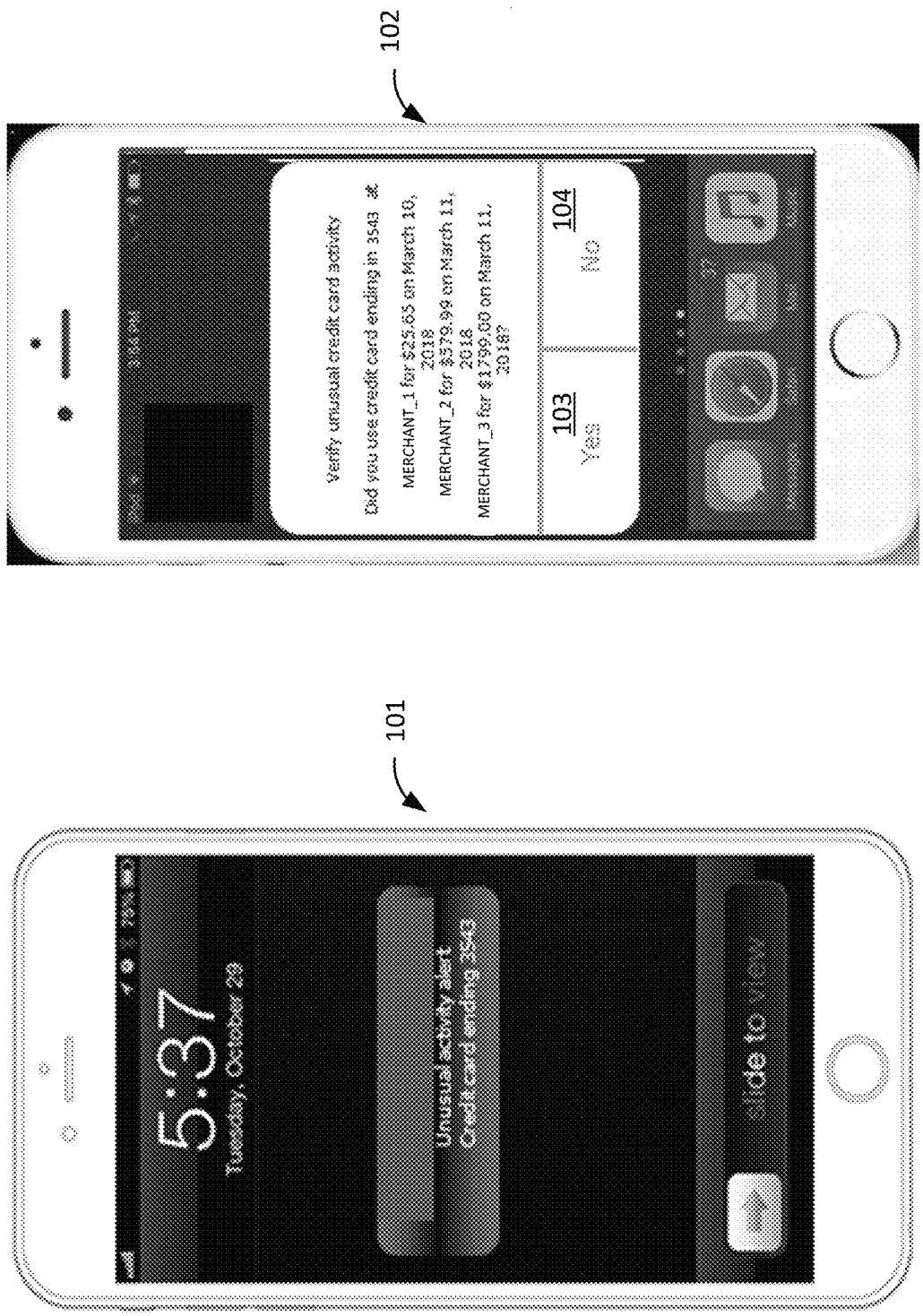
FIG. 1 shows an exemplary screenshot when a wireless device (for example, a smartphone) receives a two-way notification about unusual activity events in accordance with one or more example embodiments.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Embodiments may support a computer system that is able to detect an unusual activity event from the activity data. Embodiments may support different types of activities including, but not limited to, financial and non-monetary transactions such as address/telephone changes, digital login verification and card activation information for a user. When an unusual activity is detected, the computer system initiates a two-way notification message to a wireless device when a user has opt-in for the associated mobile application. The wireless device may consequently display notification information outside the mobile application that includes one or more action buttons. Based on the action button selected by the user, a response is sent from the wireless device and the computer system that is indicative whether the unusual activity event type is valid or invalid. For example, when the unusual activity event comprises one or more financial transactions attributed to the user, the user may select (for example, click on) one of two action buttons indicative whether the transactions are valid or invalid (which in some cases may be considered fraud). When the unusual activity event is valid, the computer system may clear the inquiry and send a one-way push notification to the wireless device to inform the user without any further action on behalf of the user. However, if the unusual activity event is invalid, further steps may be pursued in order to resolve the situation.

By utilizing a two-way push notification message while outside the mobile application at the wireless device, direct interaction of the user with the mobile application may be circumvented. This approach enables the user to have an ability to self-service event alerts without having to login to the mobile application by selecting action buttons generated from the two-way push notification message.

With traditional approaches, event notification may be supported by short message service (SMS) messages from a computer system to the user's wireless device. The user can respond by the sending a responsive SMS message to the computer system. However, this approach may have a number of deficiencies. For example, sending a SMS message may be substantial in cost (which may be 50 cents per alert) while being restricted due to legal limitations. Also, SMS is not designed with workflows in mind and typically requires blocks of words and multiple messages. SMS is free form so that a user may respond with unrecognized text and may be vulnerable to impersonation and/or user uncertainty.

FIG. 1 shows an exemplary screenshot when a wireless device (for example, a smartphone) receives a two-way notification about unusual activity events in accordance with one or more example embodiments. (In the following example, the user has installed an associated mobile application and has opt-in for the mobile application. If that is not the case, other ways of notifying the user may be utilized as will be discussed.) When a computer system detects an unusual activity event, the computer system sends a two-way push notification message to the user's wireless device. In the example shown in FIG. 1, screenshot 101 is displayed at the wireless device.

Unlike pull notifications, in which a user requests information from a server, push notifications originate from a server. Typically, the user must opt-in to receive push notifications, where opting-in usually takes place during the installation process of a mobile application and the user is provided with a way to manage push notifications.

If the user accepts the two-way push notification, unauthenticated page 102 is displayed so that the user can respond to the notification while outside the mobile application. For example, the mobile application need not be executing for the user in order to receive a push notification. Exemplary screenshot 102 shows a list of three transactions. However, embodiments may support from one to many transactions.

Unauthenticated page 102 presents action buttons 103 and 104 to enable a user to verify the push notification directly and to allow the user to respond from within the notification itself. If the user selects (for example, clicks on or touches) button 103 ("YES") or button 104 ("NO"), the user verifies that the listed transactions are valid or invalid, respectively.

The exemplary approach shown in FIG. 1 provides a user with an ability to self-service fraud alerts without having to login to the mobile application simply by using action buttons 103 and 104 generated from the received two-way push notification message.

The mobile push notification self-service is typically fast (delivered within seconds), simple (no login, just tap the "YES" button if valid), virtually no cost (no "per drip" expense while data rates may apply for customer, but extremely minimal), and intuitive (an intuitive interface reduces any customer confusion with instructions and actions they need to take).

Figure 2:
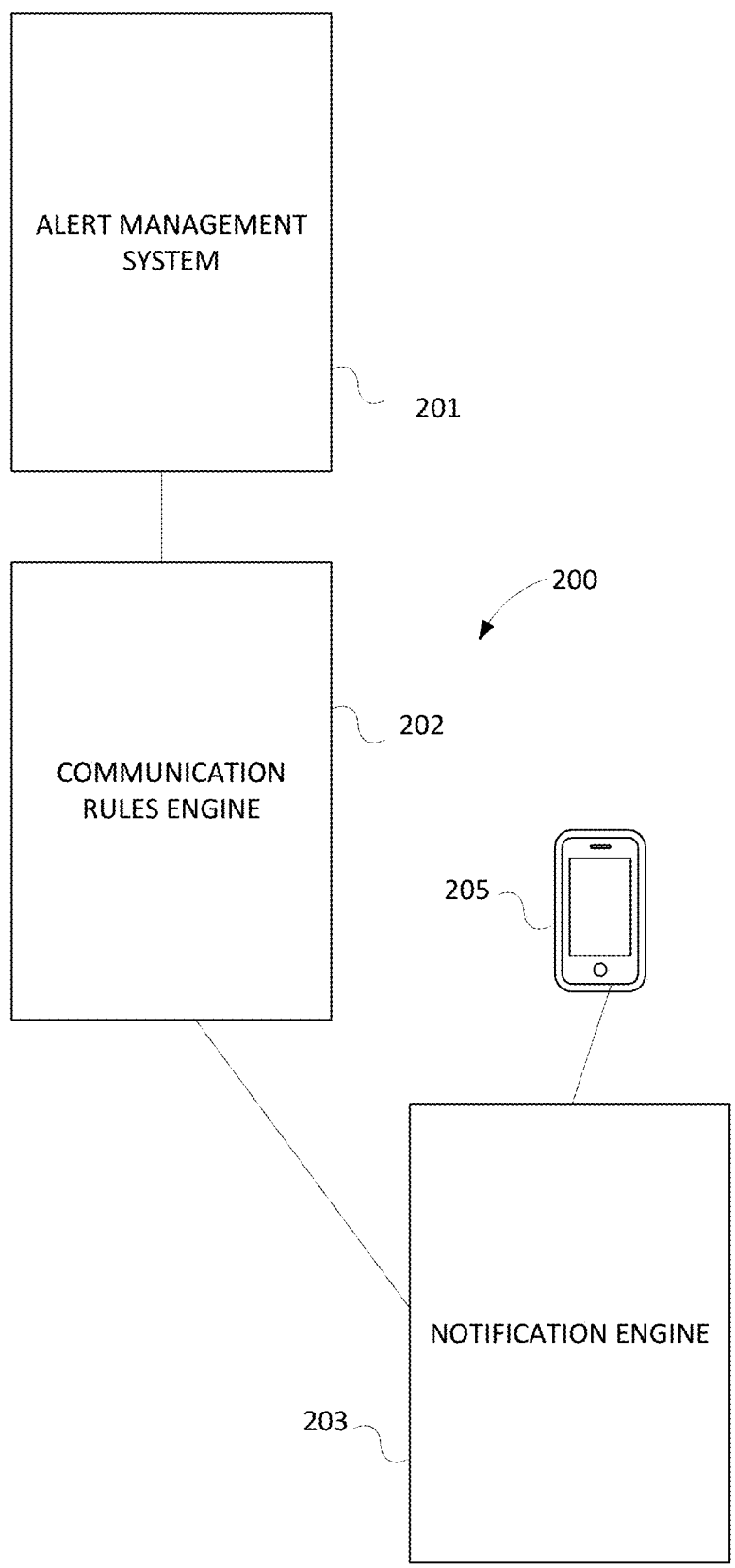
FIG. 2 illustrates a computing system that processes activity events in accordance with one or more example embodiments.

FIG. 2 illustrates computing system 200 that processes activity events and generates alert notifications to wireless device 205 when unusual activity events are detected by computing system 200 in accordance with one or more example embodiments. Computer system 200 comprises alert management system 201, communication rules engine 202, and notification engine 203.

Alert management system 201 obtains activity data (for example, transaction information) about a user and determines whether an unusual activity event occurred. For example, the user may have transactions in Miami and in Seattle during the same hour of a given day.

When alert management system 201 detects an unusual activity event, it may generate a notification request to communication rules engine 202, which consequently determines a mode of communication for sending an event alert to wireless device 205 based on user information. User information may include an identification of the user's wireless device, whether the user has opt-in for a corresponding mobile application, wireless device type of the user's wireless device, the user's telephone number, and/or the preferred mode of notification of the user. If communication rules engine 202 determines that a two-way push notification should be sent to wireless device 205, communication rules engine 202 initiates a two-way push notification through notification engine 203.

While not explicitly shown, notification engine 203 may send two-way push notification messages via an appropriate push notification service using a corresponding Application Programming Interface (API) based on the wireless device type.

While not explicitly shown, communication rule engine 202 may initiate a SMS message through a SMS interface via an appropriate wireless messaging service.

With some embodiments, while a user has opt-in for the mobile application, computer system 200 may alert the user via some other means other through a two-way push notification. For example, the user may have been previously alerted through two-way push notification, and consequently computer system 200 determines that a more stringent means is needed (for example, via a direct telephone call to the user by a security specialist).

Figure 3:
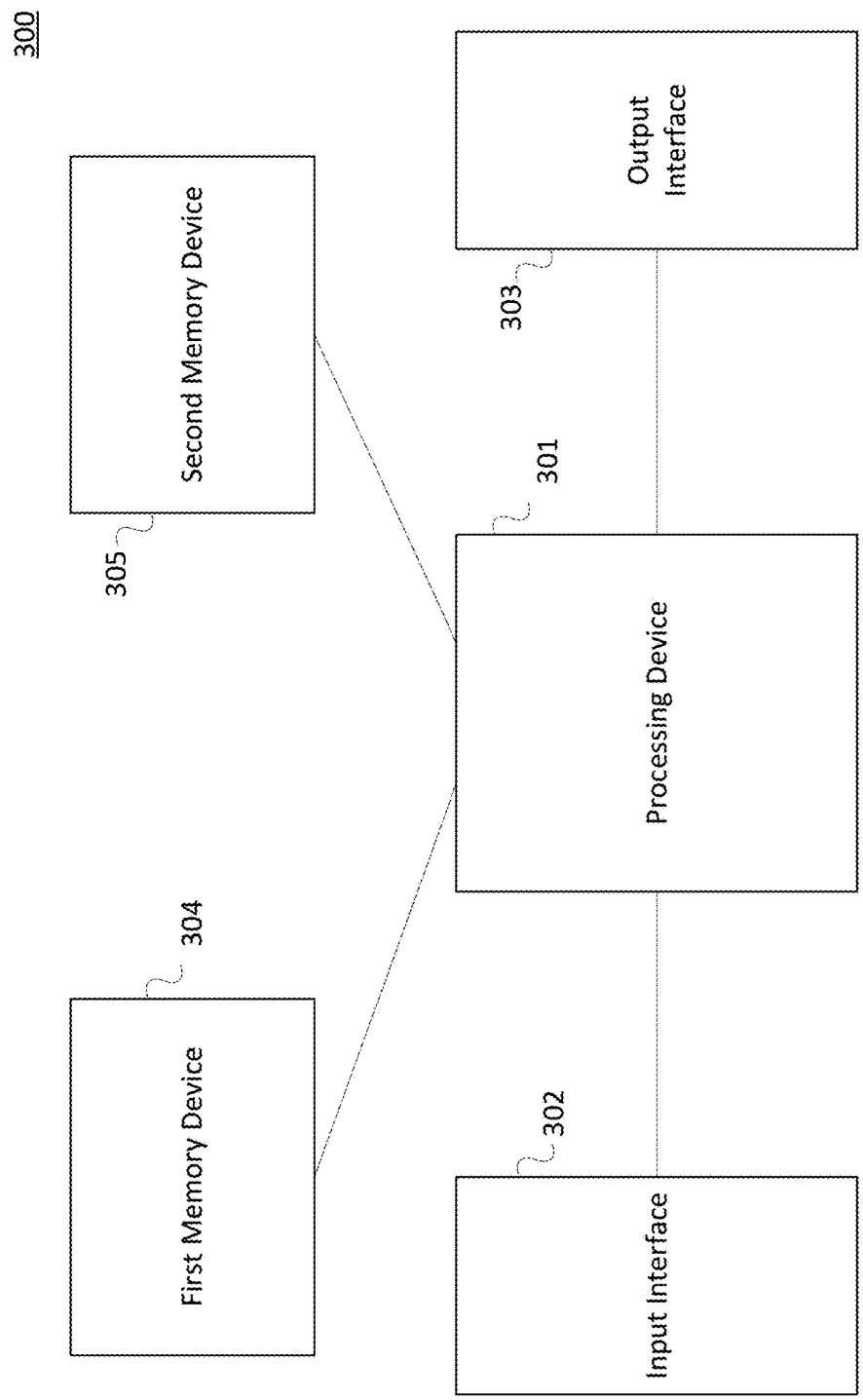
FIG. 3 illustrates a suitable computing system environment for supporting one or more computing devices in the computing system shown in FIG. 2 according to one or more illustrative embodiments.
Figure 4:
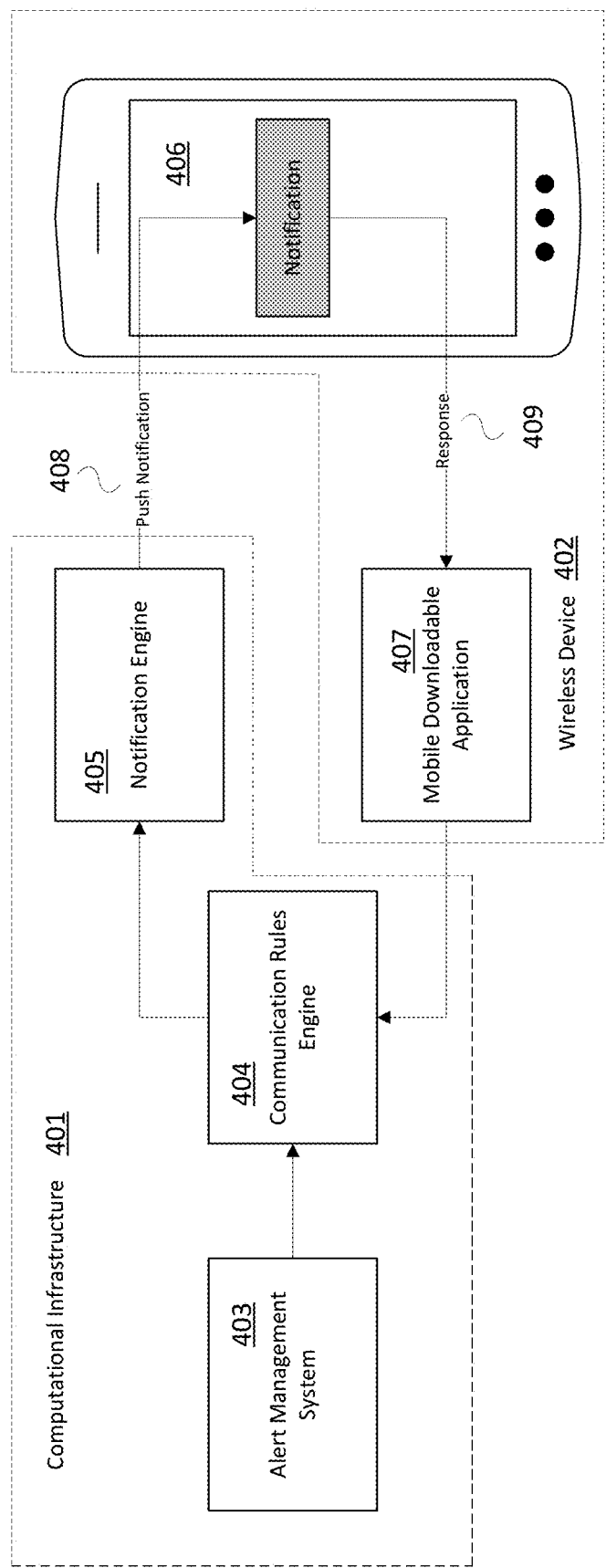
FIG. 4 illustrates an interaction between a computational infrastructure and a wireless device when possible unusual activity events are detected according to one or more illustrative embodiments.

FIG. 3 illustrates an example of suitable computing system environment 300 for supporting one or more computing devices of computing system 200, as shown in FIG. 2, or computational infrastructure 401 as shown in FIG. 4, according to one or more illustrative embodiments.

Computing device 301 may have a processor for controlling overall operation of the computing device 301 and its associated components, including memory devices 304 and 305, input interface 302, and output interface 303.

Computing device 301 receives input information (for example data or messages) via input interface 302 and sends output information (for example, data or messages) via output interface 303.

Computing device 301 typically includes a variety of computer readable media. Computer readable media may be any available media that may be accessed by computing device 301 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Computer-executable instructions may be stored within first memory device 304 and/or storage to provide instructions to a processor for enabling computing device 301 to perform various functions. For example, memory device 304 may store computer-executable used by computing device 301, such as an operating system, application programs, and an associated database. Alternatively, some or all of the computer executable instructions for computing device 301 may be embodied in hardware or firmware (not explicitly shown).

Embodiments of the invention may include forms of computer-readable media. Computer-readable media include any available media that can be accessed by a computing device 301. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

First memory device 304 may include one or more program modules having instructions that when executed by computing device 301 cause computational infrastructure 401 to perform one or more functions described herein.

Although not required, various aspects described herein may be embodied as a method, a data processing system, or as a computer-readable medium storing computer-executable instructions. For example, a computer-readable medium storing instructions to cause a processor to perform steps (blocks) of a method in accordance with aspects of the invention is contemplated. For example, aspects of the method steps disclosed herein may be executed on a processor on computing device 301. Such a processor may execute computer-executable instructions stored on a computer-readable medium.

With some embodiments, non-executable data (for example, user information) may be stored in second memory device 305.

Computing device 301 may operate in a networked environment supporting connections to one or more remote computers, such as terminals. The terminals may be personal computers or servers that include any or all of the elements described above with respect to the computing device. The network connections include a local area network (LAN) and a wide area network (WAN), but may also include other networks. When used in a LAN networking environment, the computing device may be connected to the LAN through a network interface or adapter. When used in a WAN networking environment, the computing device may include a modem or other network interface for establishing communications over the WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device and/or terminals may also be mobile terminals (for example, mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Another illustrative system for implementing methods according to the present disclosure may be used. The system may include one or more workstations. The workstations may be used by, for example, agents or other employees of an institution (for example, a financial institution) and/or customers of the institution. Workstations may be local or remote, and are connected by one or more communications links to computer network that is linked via communications links to the server. In the system, the server may be any suitable server, processor, computer, or data processing device, or combination of the same.

A computer network may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links may be any communications links suitable for communicating between the workstations and the server, such as network links, dial-up links, wireless links, hard-wired links, and the like.

FIG. 4 illustrates computational infrastructure 401 and wireless device 402 when possible unusual activity events are detected according to one or more illustrative embodiments.

Computational infrastructure 401 comprises alert management system 403, communication rules engine 404, and notification engine 405 and may operate in a similar manner as alert management system 201, communication rules engine 202, and notification engine 203, respectively, as shown in FIG. 2.

When wireless device 402 receives two-way push notification message 408 from computational infrastructure 401, notification information is displayed at display 406 of wireless device 402. (An exemplary screenshot is shown in FIG. 1 as previously discussed.) Response 409 is passed through mobile application 407 to computational infrastructure 401, where response 409 is indicative of the action button (not explicitly shown in FIG. 4) selected by the user. With embodiments, mobile application 407 may be transparent to the user, for example, running in the background when response 407 passes through mobile application 407.

As will be discussed, if response 409 is indicative that the detected unusual activity event is invalid, interaction between wireless device 401 and computational infrastructure 401 may be established in order to resolve the issue. For example, mobile application 407 may be activated so that the user can interact with computational infrastructure 701 through mobile application 407. With embodiments, mobile application 407 may be automatically activated, where the user would need to authenticate to mobile application 407 and would be directed to an action for resolving the detected unusual activity event.

Figure 5:
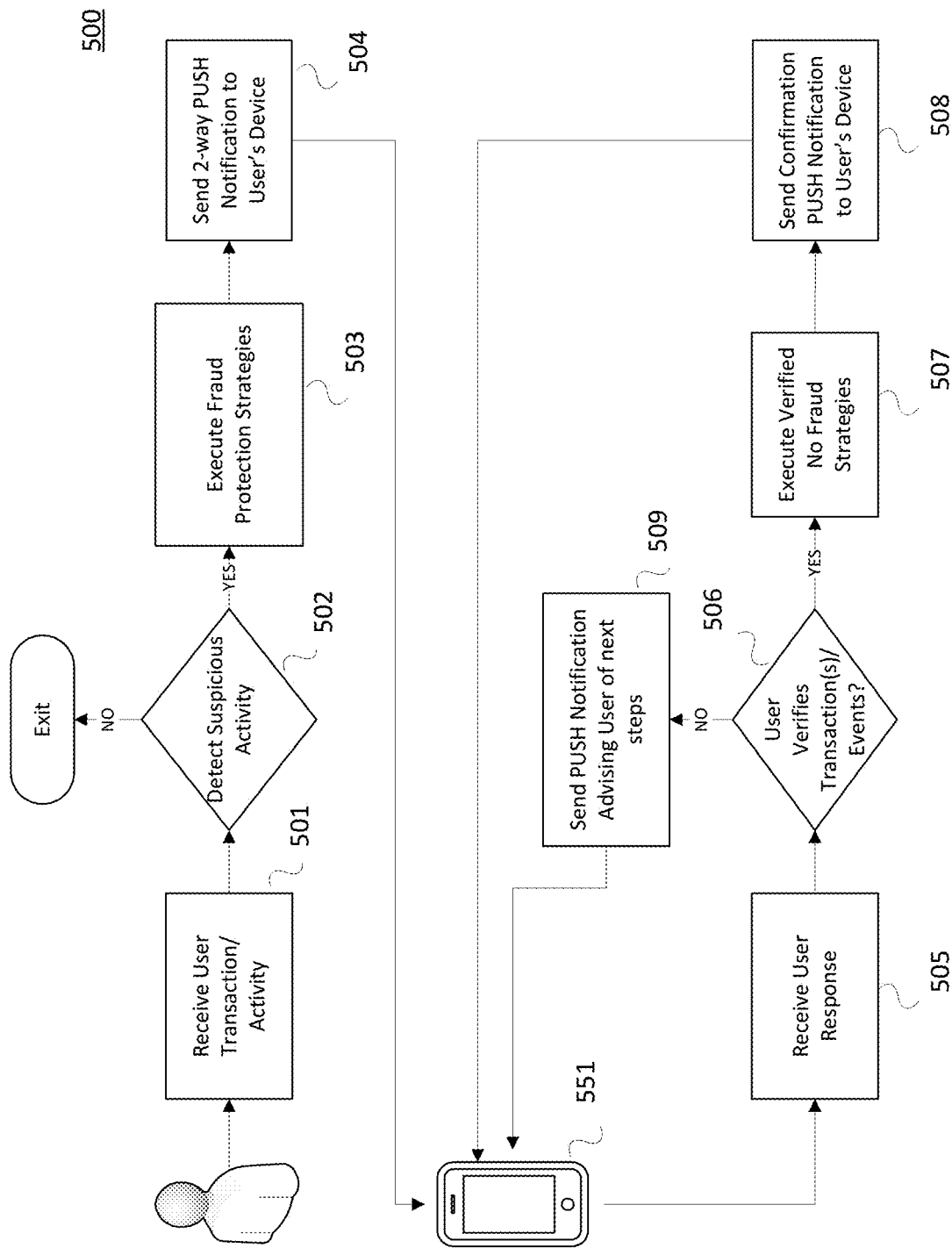
FIG. 5 illustrates a process flow for the interaction shown in FIG. 4 according to one or more illustrative embodiments.

FIG. 5 illustrates process flow 500 for the interaction between computational infrastructure 401 and wireless device 402, shown in FIG. 4, according to one or more illustrative embodiments. With the embodiment, activity event comprises one or more transaction attributed to a user. However, embodiments may support other types of activity types as previously discussed.

At block 501, a computer system (for example, alert management system 403) obtains transaction activity data and processes the data to determine whether an unusual activity event is detected at block 502. For example, the computer system may detect a plurality of transactions that are suspicious. If so, process 500 advances to block 503 to execute a protection strategy for the detected unusual activity event on behalf of the user. With the embodiment shown in FIG. 5, the executed protection strategy determines that a notification message should be sent to the user's wireless device 551. However, the protection strategy may identify a different result for different circumstances.

At block 504, in response to block 503, the computer system initiates transmission of a two-way push notification message to wireless device 551. As previously discussed, the two-way push notification message is received at wireless device 551 outside the mobile application. However, embodiments may support receiving a notification alert when inside the mobile application. For example, the notification alert may appear inside the mobile application when the user is currently using the mobile application.

At block 505, the computer system receives a response from wireless device 551 that is indicative whether the user deems the unusual activity event as being valid or invalid based on a selected action button as identified at block 506.

Once the user responds that the unusual activity event is invalid (in some situations, fraudulent), the user may be taken to a workflow to continue with the claim filing process.

If the unusual activity event is invalid, a push notification (for example, a one-way push notification message) is sent at block 509 to mobile device 551 to inform the user about next steps for resolving the issue. For the example, the user may be advised to call a particular telephone of a security specialist or to activate the mobile application. With some embodiments, the mobile application may be automatically activated and configured to facilitate resolving the issue for the user. For example, the user may click on the push notification to navigate to the mobile application to begin the resolution of the unusual activity event.

With some embodiments, the mobile application may support capabilities including filing a claim, touch ID authentication, and presenting fraud prevention tips.

Referring back to FIG. 5, if the unusual activity event is deemed valid by the user, the inquiry may be cleared at block 507. The user may be notified of the resolution (for example, the user can proceed with transactions) through a one-way notification message at block 508 (where no further response by the user is needed).

Figure 6:
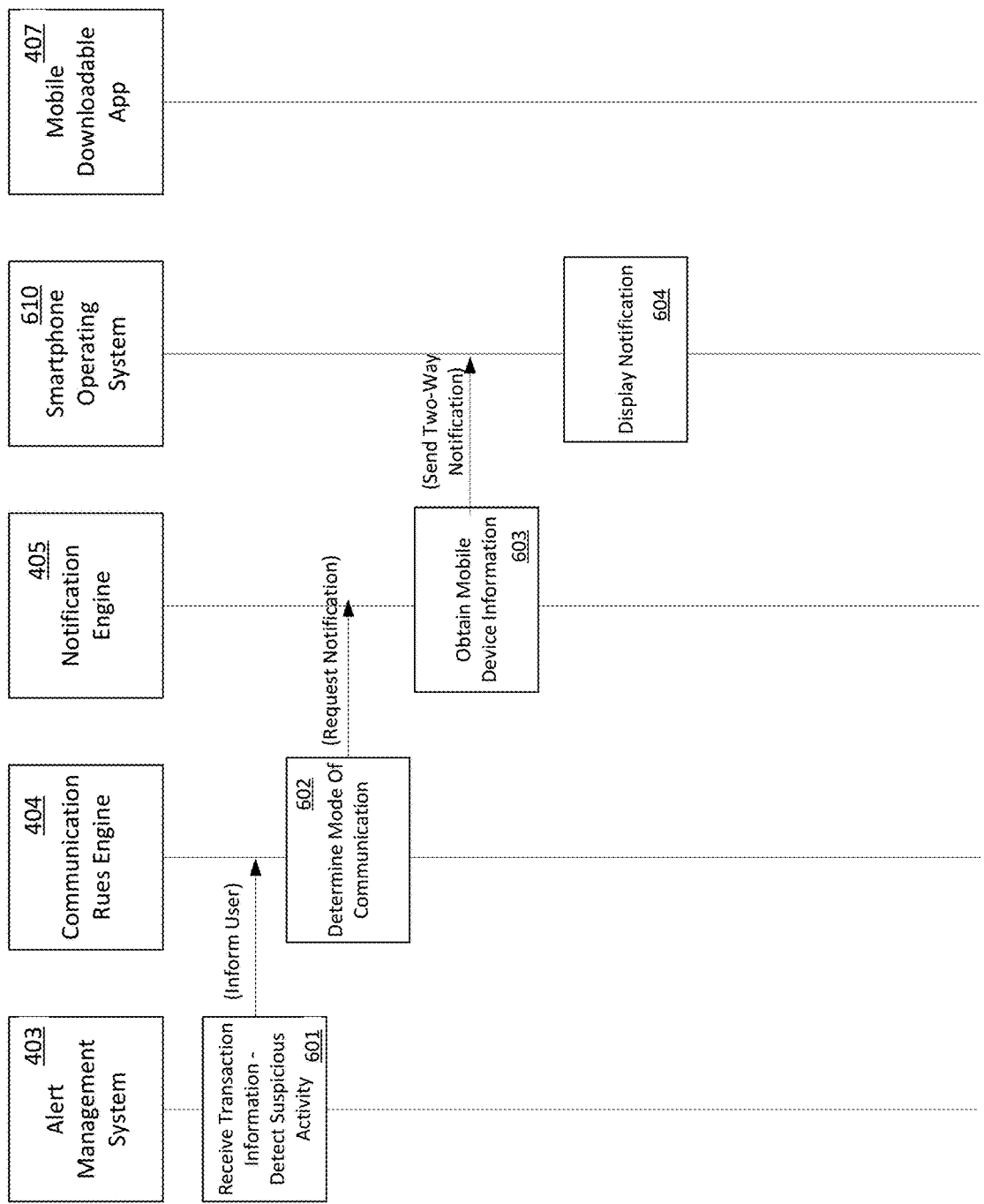
FIG. 6 shows a message flow between computing devices in a computing system shown in FIG. 2 when unusual activity events are detected in accordance with one or more example embodiments.
Figure 7:
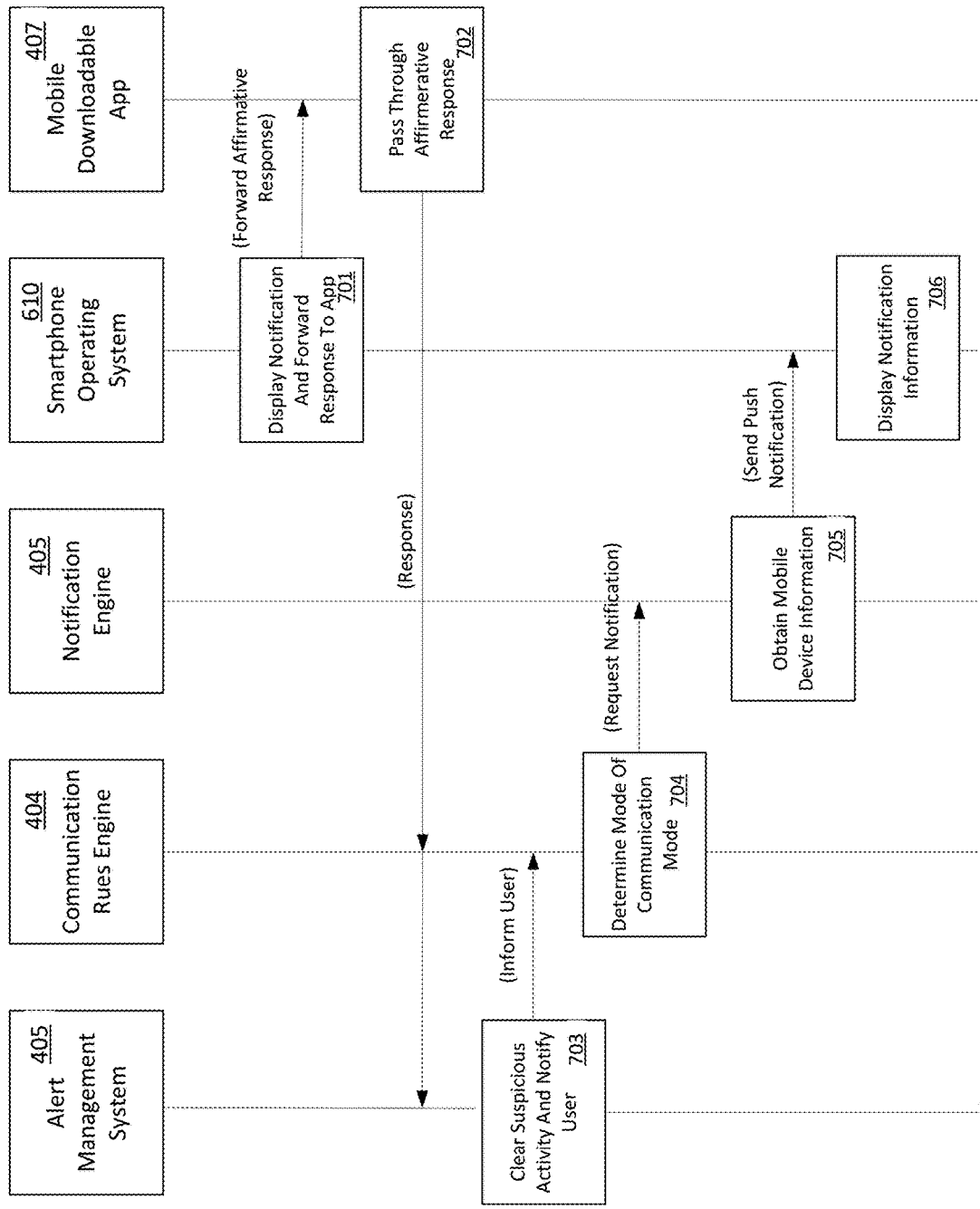
FIG. 7 is a continuation of the message flow shown in FIG. 6 when the unusual activity events are deemed valid in accordance with one or more example embodiments.
Figure 8:
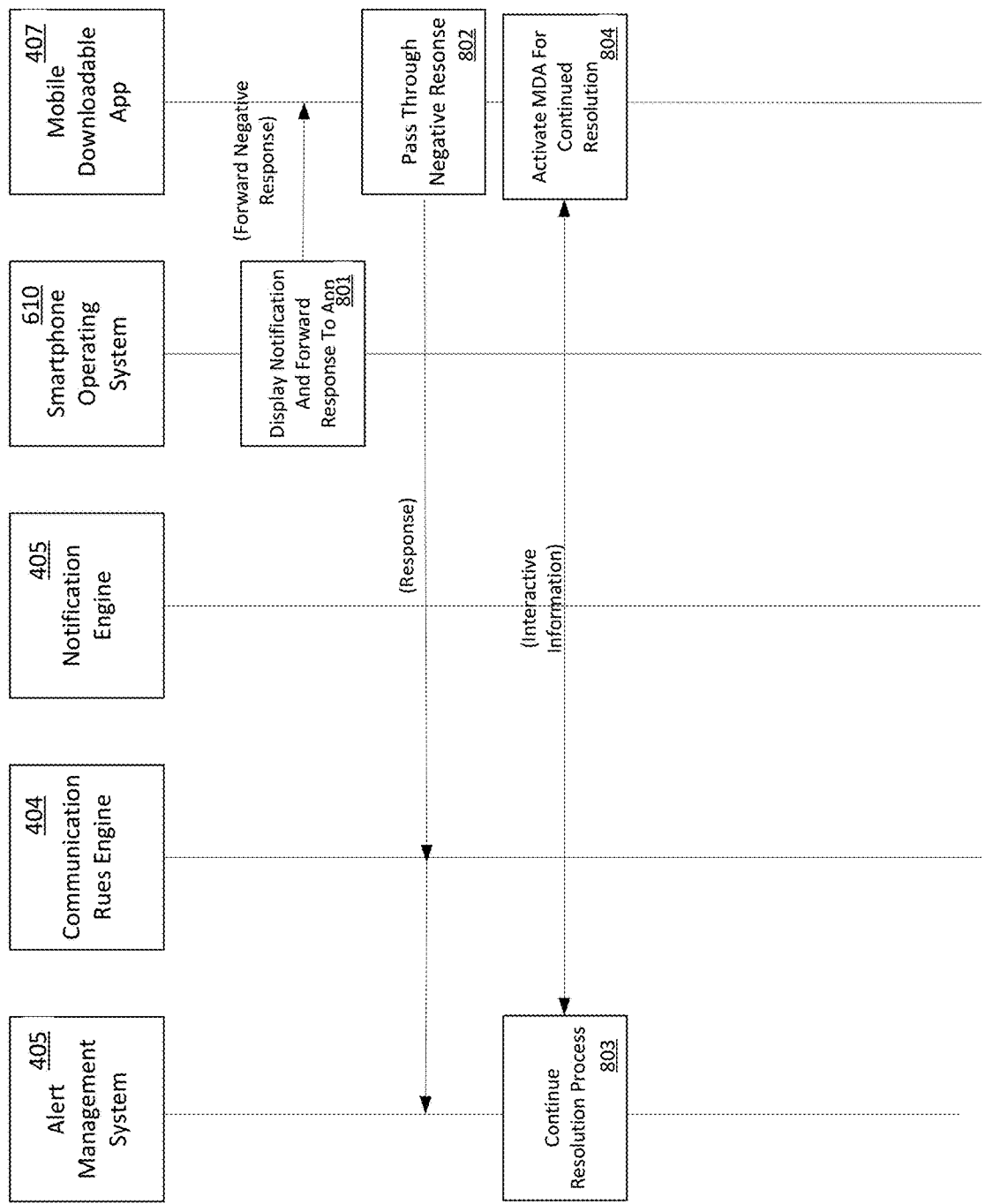
FIG. 8 is a continuation of the message flow shown in FIG. 6 when the unusual activity events are deemed invalid in accordance with one or more example embodiments.

FIGS. 6-8 show message flows that are based on process 500.

FIG. 6 shows a message flow between computing devices in a computing system shown in FIG. 2 when unusual activity events are detected in accordance with one or more example embodiments. At block 601, alert management system 403 (as shown in FIG. 4) obtains transaction information and detects suspicious activity.

At block 602, communication rules engine subsequently determines the mode of communication to inform a wireless device (corresponding to smartphone operating system 610 and downloadable mobile application 407) based user information accessed at block 603. In the embodiment shown in FIG. 6, it assumed that mobile application 407 has been installed and the user has opt-in.

Notification engine 405 initiates transmission of a two-way push notification through smartphone operating system 610, and consequently the wireless device displays the notification information (for example, screenshots 101 and 102 as shown in FIG. 1) at block 604, including a plurality of action buttons.

FIG. 7 is a continuation of the message flow shown in FIG. 6 when the unusual activity events are deemed valid by the user in accordance with one or more example embodiments.

At block 701, smartphone operating system 610 receives an indication of the selected action button and passes the selection information to mobile downloadable application 407 at block 702. Application 407 passes the selection information through to communication rules engine 404.

With some embodiments at block 703 communication rules engine 404 initiates the clearing of the inquiry at alert management system 405. Through blocks 704-706, the wireless device consequently receives a push notification (for example, a one-way push notification message) providing information that is displayed informing that the user can proceed with the associated activity through blocks 704-706

FIG. 8 is a continuation of the message flow shown in FIG. 6 when the unusual activity events are deemed invalid in accordance with one or more example embodiments.

At block 801, smartphone operating system 610 receives an indication of the selected action button and provides the selection information to mobile downloadable application 407 at block 802. Mobile application 407 passes through the response information to communication rules engine 404.

With some embodiments at block 803 communication rules engine 404 informs alert management system 405 to establish further interaction with the user through mobile application 407 via block 804 in order to resolve the unusual activity event. For example, mobile application 407 may interact with communication rules engine 404, where another push notification is needed to activate mobile application 407 for resolution of the unusual activity event.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A wireless device comprising:
at least one processor;
a display device;
a communication interface communicatively coupled to the at least one processor; and
memory storing computer-readable instructions that, when executed by the at least one processor, cause the wireless device to:
when an application status is indicative that a user has opt-in for a mobile application, receive, through the communication interface by the wireless device from a transaction computing system, a two-way push notification message about a detected unusual activity event while outside the mobile application;
display, by the wireless device, displayed notification information about the detected unusual activity event;
in response to the displaying, obtain, by an operating system of the wireless device, an activity indicator about the detected unusual activity event;
send a forward response from the operating system of the wireless device to the mobile application, wherein the forward response is indicative of the activity indicator;
send a notification response message, by the wireless device via the mobile application bypassing the operating system, to the transaction computing system, the notification response message indicative of the activity indicator;
in response to the sending, when the activity indicator is indicative that the detected unusual activity event is valid, receive by the operating system of the wireless device, a notification message that the user can proceed with an associated activity; and
in response to the sending, when the activity indicator is indicative that the detected unusual activity event is invalid, receive by the mobile application bypassing the operating system, further interaction with the user for a resolution of the detected unusual activity event.

2. The wireless device of claim 1, wherein the memory storing computer-readable instructions that, when executed by the at least one processor, cause the wireless device to:
when the activity indicator is indicative that the detected unusual activity event is valid, receive a subsequent push notification message by the wireless device while outside the mobile application at the wireless device, wherein the subsequent push notification message is indicative of a proper activity status for the user.

3. The wireless device of claim 1, wherein the memory storing computer-readable instructions that, when executed by the at least one processor, cause the wireless device to:
pass, through the mobile application, the activity indicator to the transaction computing system when the activity indicator is indicative that the detected unusual activity event is valid.

4. The wireless device of claim 1, wherein the memory storing computer-readable instructions that, when executed by the at least one processor, cause the wireless device to:

when the activity indicator is indicative that the detected unusual activity event is invalid, redirect the wireless device to the mobile application in conjunction with the operating system passing selected information entered by the user to the mobile application.

5. The wireless device of claim 4, wherein the memory storing computer-readable instructions that, when executed by the at least one processor, cause the wireless device to:
initiate an interaction between an alert management computing system and the wireless device through the mobile application when authentication has successfully completed, wherein the interaction enables a resolution of the detected unusual activity event.

6. The wireless device of claim 1, wherein the memory storing computer-readable instructions that, when executed by the at least one processor, cause the wireless device to:
when the activity indicator is indicative that the detected unusual activity event is invalid, automatically activate the mobile application, wherein the user is directed for an action to resolve the detected unusual activity event.

7. The wireless device of claim 1, wherein the memory storing computer-readable instructions that, when executed by the at least one processor, cause the wireless device to:
receive an acceptance indicator whether to accept a first two-way push notification message; and
in response to accepting the first two-way push notification message, generate an unauthenticated page displaying notification information.

8. One or more non-transitory computer-readable media storing computer-readable instructions that, when executed by a wireless device, cause the wireless device to:
when an application status is indicative that a user has opt-in for a mobile application, receive, through a communication interface by the wireless device from a transaction computing system, a two-way push notification message about a detected unusual activity event while outside the mobile application;
display, by the wireless device, displayed notification information about the detected unusual activity event;
in response to the displaying, obtain, by an operating system of the wireless device, an activity indicator about the detected unusual activity event;
send a forward response from the operating system of the wireless device to the mobile application, wherein the forward response is indicative of the activity indicator;
send a notification response message, by the wireless device via the mobile application bypassing the operating system, to the transaction computing system, the notification response message indicative of the activity indicator;
in response to the sending, when the activity indicator is indicative that the detected unusual activity event is valid, receive by the operating system of the wireless device, a notification message that the user can proceed with an associated activity; and
in response to the sending, when the activity indicator is indicative that the detected unusual activity event is invalid, receive by the mobile application bypassing the operating system, further interaction with the user for a resolution of the detected unusual activity event.

9. The one or more non-transitory computer-readable media of claim 8, storing computer-readable instructions that, when executed by the wireless device, cause the wireless device to:
when the activity indicator is indicative that the detected unusual activity event is valid, receive a subsequent push notification message by the wireless device while outside the mobile application at the wireless device, wherein the subsequent push notification message is indicative of a proper activity status for the user.

10. The one or more non-transitory computer-readable media of claim 8, storing computer-readable instructions that, when executed by the wireless device, cause the wireless device to:
pass, through the mobile application, the activity indicator to the transaction computing system when the activity indicator is indicative that the detected unusual activity event is valid.

11. The one or more non-transitory computer-readable media of claim 8, storing computer-readable instructions that, when executed by the wireless device, cause the wireless device to:
when the activity indicator is indicative that the detected unusual activity event is invalid, redirect the wireless device to the mobile application in conjunction with the operating system passing selected information entered by the user to the mobile application.

12. The one or more non-transitory computer-readable media of claim 8, storing computer-readable instructions that, when executed by the wireless device, cause the wireless device to:
when the activity indicator is indicative that the detected unusual activity event is invalid, automatically activate the mobile application, wherein the user is directed for an action to resolve the detected unusual activity event.

13. The one or more non-transitory computer-readable media of claim 8, storing computer-readable instructions that, when executed by the wireless device, cause the wireless device to:
when the activity indicator is indicative that the detected unusual activity event is valid, receive a subsequent push notification message by the wireless device while outside the mobile application at the wireless device, wherein the subsequent push notification message is indicative of a proper activity status for the user.

14. A method for providing a notification of an activity event through a wireless device, the method comprising:
when an application status is indicative that a user has opt-in for a mobile application, receiving, by the wireless device from a transaction computing system, a two-way push notification message about a detected unusual activity event while outside the mobile application;
displaying, by the wireless device, displayed notification information about the detected unusual activity event;
in response to the displaying, obtaining, by an operating system of the wireless device, an activity indicator about the detected unusual activity event;
sending a forward response from the operating system of the wireless device to the mobile application, wherein the forward response is indicative of the activity indicator;
sending a notification response message, by the wireless device via the mobile application bypassing the operating system, to the transaction computing system, the notification response message indicative of the activity indicator;
in response to the sending, when the activity indicator is indicative that the detected unusual activity event is valid, receiving by the operating system of the wireless device, a notification message that the user can proceed with an associated activity; and in response to the sending, when the activity indicator is indicative that the detected unusual activity event is invalid, receiving by the mobile application bypassing the operating system, further interaction with the user for a resolution of the detected unusual activity event.

15. The method of claim 14 further comprising:

when the activity indicator is indicative that the detected unusual activity event is valid, receiving a subsequent push notification message by the wireless device while outside the mobile application at the wireless device, wherein the subsequent push notification message is indicative of a proper activity status for the user.

16. The method of claim 14 further comprising:

passing, through the mobile application, the activity indicator to the transaction computing system when the activity indicator is indicative that the detected unusual activity event is valid.

17. The method of claim 14 further comprising:

when the activity indicator is indicative that the detected unusual activity event is invalid, redirecting the wireless device to the mobile application in conjunction with the operating system passing selected information entered by the user to the mobile application.

18. The method of claim 17 further comprising:

initiating an interaction between an alert management computing system and the wireless device through the mobile application when authentication has successfully completed, wherein the interaction enables a resolution of the detected unusual activity event.

19. The method of claim 14 further comprising:

when the activity indicator is indicative that the detected unusual activity event is invalid, automatically activating the mobile application, wherein the user is directed for an action to resolve the detected unusual activity event.

20. The method of claim 14 further comprising:

receiving an acceptance indicator whether to accept a first two-way push notification message; and in response to accepting the first two-way push notification message, generating an unauthenticated page displaying notification information.

* * * * *